US007604783B2

(12) United States Patent
King et al.

(10) Patent No.: US 7,604,783 B2
(45) Date of Patent: Oct. 20, 2009

(54) REDUCTION OF LIME CONSUMPTION WHEN TREATING REFRACTOR GOLD ORES OR CONCENTRATES

(75) Inventors: James A. King, West Vancouver (CA); Jinxing Ji, Burnaby (CA); Christopher Andrew Fleming, Omemee (CA); Cesare Giosue Ferron, Peterborough (CA)

(73) Assignee: Placer Dome Technical Services Limited, British Columbia (CA)

( * ) Notice: Subject to any disclaimer, the term of this patent is extended or adjusted under 35 U.S.C. 154(b) by 419 days.

(21) Appl. No.: 11/249,120

(22) Filed: Oct. 11, 2005

(65) Prior Publication Data

US 2006/0133974 A1 Jun. 22, 2006

Related U.S. Application Data

(60) Provisional application No. 60/678,001, filed on May 4, 2005, provisional application No. 60/638,685, filed on Dec. 22, 2004.

(51) Int. Cl.
C22B 11/00 (2006.01)
(52) U.S. Cl. .......................................... 423/36; 423/29
(58) Field of Classification Search ........................ None
See application file for complete search history.

(56) References Cited

U.S. PATENT DOCUMENTS

| 1,308,639 A | 7/1919 | Newdick |
| 1,461,807 A | 7/1923 | Silver |
| 2,147,009 A | 2/1939 | Chapman |
| 2,234,140 A | 3/1941 | Falconer et al. |
| 2,315,187 A | 3/1943 | Chapman |
| 2,470,707 A | 4/1948 | Herrmann |
| 2,476,420 A | 7/1949 | Krebs |
| 2,478,652 A | 8/1949 | Byler et al. |
| 2,479,930 A | 8/1949 | Herkenhoff |
| 2,502,490 A | 4/1950 | Sweet |
| 2,519,770 A | 8/1950 | Kramer |
| 2,545,239 A | 3/1951 | McQuiston, Jr. et al. |
| 2,579,531 A | 12/1951 | Zadra |
| 2,588,450 A | 3/1952 | Zadra |
| 2,612,470 A | 9/1952 | Griess, Jr. et al. |
| 2,646,347 A | 7/1953 | Jacks et al. |
| 2,658,827 A | 11/1953 | Rizo-Patron |
| 2,726,934 A | 12/1955 | Forward et al. |
| 2,777,764 A | 1/1957 | Hedley et al. |
| 2,804,379 A | 8/1957 | Wistrich et al. |
| 2,827,372 A | 3/1958 | Britton |
| 2,836,490 A | 5/1958 | Mackiw et al. |
| 2,867,529 A | 1/1959 | Forward et al. |
| 2,893,846 A | 7/1959 | Wistrich et al. |
| 2,919,802 A | 1/1960 | Drake |
| 2,928,661 A | 3/1960 | MacLaren |
| 2,954,290 A | 9/1960 | Teichmann et al. |
| 2,989,380 A | 6/1961 | Weiss et al. |
| 3,010,803 A | 11/1961 | Wistrich et al. |
| 3,010,804 A | 11/1961 | Wistrich et al. |
| 3,013,866 A | 12/1961 | Samaniego et al. |
| 3,018,170 A | 1/1962 | Soloducha |
| 3,088,820 A | 5/1963 | Mackiw et al. |
| 3,130,015 A | 4/1964 | Monroe |
| 3,174,848 A | 3/1965 | Bruce |
| 3,215,611 A | 11/1965 | Pawick et al. |
| 3,264,099 A * | 8/1966 | Johnson ........................ 423/41 |
| 3,266,872 A | 8/1966 | Terao et al. |
| 3,285,705 A | 11/1966 | Zuiderweg et al. |
| 3,293,027 A | 12/1966 | Mackiw et al. |
| 3,322,505 A | 5/1967 | Weber |
| 3,357,823 A | 12/1967 | Tuwiner |
| 3,414,245 A | 12/1968 | Frazer |
| 3,440,256 A | 4/1969 | Rich |
| 3,463,710 A | 8/1969 | Lower |
| 3,477,928 A | 11/1969 | Coltrinari |
| 3,522,018 A | 7/1970 | Bachmann et al. |
| 3,523,762 A | 8/1970 | Broughton |
| 3,529,026 A | 9/1970 | Blumcke et al. |
| 3,537,824 A | 11/1970 | Schmidt |
| 3,547,589 A | 12/1970 | Rice et al. |
| 3,549,351 A | 12/1970 | Lundquist |
| 3,574,600 A | 4/1971 | Scholmer et al. |
| 3,599,601 A | 8/1971 | Ishikawa |
| 3,615,260 A | 10/1971 | Hanson |

(Continued)

FOREIGN PATENT DOCUMENTS

CL 35268 4/1986

(Continued)

OTHER PUBLICATIONS

Dutrizac "Converting jarosite residues into compact hematite products", JOM, Jan. 1990, p. 36-39.
Geldart et al. "Hydrothermal processing of Kidd Creek jarosites for stabilization and metal recovery" in Iron Control and Disposal Symposium, Ottawa, 1996, p. 659-674.
Kunda and Veltman "Decomposition of jarosite" Metallurgical Transactions B, vol. 10B, Sep. 1979, p. 439-446.
Adams et al. "Mixing Optimization of High Pressure Oxidation of Gold Ore Slurries", Randol Gold & Silver Forum, 1998, p. 217-221.
Notification of Transmittal of The International Search Report and The Written Opinion of the International Searching Authority, or the Declaration, issued in PCT/CA2005/001873, mailed Mar. 28, 2006, 11 pages total.

(Continued)

Primary Examiner—Melvin C Mayes
Assistant Examiner—Sheng Han
(74) Attorney, Agent, or Firm—Sheridan Ross P.C.

(57) ABSTRACT

The present invention is directed to a precious metal recovery process in which basic ferric sulphates and/or jarosites are controlled by a number of mechanisms, including control of the oxidation reaction conditions in the first autoclave compartment, hot curing of the autoclave discharge slurry, and/or contacting of the autoclave feed slurry with the hot cured discharge liquid.

60 Claims, 4 Drawing Sheets

U.S. PATENT DOCUMENTS

| | | | |
|---|---|---|---|
| 3,639,925 A | 2/1972 | Scheiner et al. |
| 3,672,873 A | 6/1972 | Huggins et al. |
| 3,687,635 A | 8/1972 | Wijard et al. |
| 3,743,501 A | 7/1973 | Cusanelli et al. |
| 3,761,566 A | 9/1973 | Michal |
| 3,809,549 A | 5/1974 | Opratko et al. |
| 3,846,124 A | 11/1974 | Guay |
| 3,867,268 A | 2/1975 | Kawulka et al. |
| 3,879,270 A | 4/1975 | Kowalski |
| 3,909,248 A | 9/1975 | Ryan et al. |
| 3,914,162 A | 10/1975 | Kowalski |
| 3,935,006 A | 1/1976 | Fischer |
| 3,954,450 A | 5/1976 | Kuhn et al. |
| 3,961,908 A | 6/1976 | Touro |
| 3,962,402 A | 6/1976 | Touro |
| 4,004,991 A | 1/1977 | Veltman et al. |
| 4,022,866 A | 5/1977 | Kuhn et al. |
| 4,029,736 A | 6/1977 | Melkonian |
| 4,038,362 A | 7/1977 | Guay |
| 4,044,096 A | 8/1977 | Queneau et al. |
| 4,052,151 A | 10/1977 | Reichrt et al. |
| 4,053,305 A | 10/1977 | Smyres et al. |
| 4,056,261 A | 11/1977 | Darrah |
| 4,070,182 A | 1/1978 | Genik-Sas-Berezowsky et al. |
| 4,085,266 A | 4/1978 | Nakai et al. |
| 4,094,668 A | 6/1978 | Yannopoulos et al. |
| 4,097,271 A | 6/1978 | Swinkels et al. |
| 4,123,600 A | 10/1978 | Kita et al. |
| 4,124,462 A | 11/1978 | Reinhardt et al. |
| 4,126,757 A | 11/1978 | Smith, Jr. et al. |
| 4,135,918 A | 1/1979 | Ettel et al. |
| 4,149,880 A | 4/1979 | Prater et al. |
| 4,153,522 A | 5/1979 | Arbiter et al. |
| 4,167,470 A | 9/1979 | Karnofsky |
| 4,188,208 A | 2/1980 | Guay |
| 4,219,354 A | 8/1980 | Rastas et al. |
| 4,249,032 A | 2/1981 | Smith, Jr. et al. |
| 4,252,924 A | 2/1981 | Chatterjee |
| 4,259,107 A | 3/1981 | Guay |
| 4,265,739 A | 5/1981 | Dalton |
| 4,266,972 A | 5/1981 | Redondo-Abad et al. |
| 4,267,069 A | 5/1981 | Davidson et al. |
| 4,269,622 A | 5/1981 | Kerley, Jr. |
| 4,279,867 A | 7/1981 | Weir |
| 4,279,868 A | 7/1981 | Von Kohorn |
| 4,289,532 A | 9/1981 | Matson et al. |
| 4,298,379 A | 11/1981 | Zambrano |
| 4,304,644 A | 12/1981 | Victorovich et al. |
| 4,331,635 A | 5/1982 | Arbiter et al. |
| 4,369,061 A | 1/1983 | Kerley, Jr. |
| 4,372,918 A | 2/1983 | Woods et al. |
| 4,374,101 A | 2/1983 | Lussiez et al. |
| 4,384,889 A | 5/1983 | Wiewiorowski et al. |
| 4,399,109 A | 8/1983 | Iler et al. |
| 4,415,542 A | 11/1983 | Queneau et al. |
| 4,423,011 A | 12/1983 | Baglin et al. |
| 4,431,613 A | 2/1984 | Verbaan |
| T104,001 I4 | 3/1984 | Kunter et al. |
| 4,436,702 A | 3/1984 | Schulz et al. |
| 4,437,953 A | 3/1984 | Newman et al. |
| 4,438,076 A | 3/1984 | Pietsch et al. |
| 4,442,072 A | 4/1984 | Baglin et al. |
| 4,501,721 A | 2/1985 | Sherman et al. |
| 4,507,274 A | 3/1985 | Broecker et al. |
| 4,517,262 A | 5/1985 | Beidler |
| 4,528,166 A | 7/1985 | McDougall |
| 4,551,213 A | 11/1985 | Wilson |
| 4,552,589 A | 11/1985 | Mason et al. |
| 4,557,905 A | 12/1985 | Sherman et al. |
| 4,559,209 A | 12/1985 | Muir et al. |
| 4,571,262 A | 2/1986 | Kerfoot et al. |
| 4,571,263 A | 2/1986 | Weir et al. |
| 4,571,264 A | 2/1986 | Weir et al. |
| 4,578,163 A | 3/1986 | Kunter et al. |
| 4,587,110 A | 5/1986 | Potter et al. |
| 4,592,779 A | 6/1986 | Russ et al. |
| 4,594,102 A | 6/1986 | Weir et al. |
| 4,595,566 A | 6/1986 | Byrd et al. |
| 4,595,572 A | 6/1986 | Ogasa et al. |
| 4,605,439 A | 8/1986 | Weir |
| 4,605,537 A | 8/1986 | Touro |
| 4,606,763 A | 8/1986 | Weir |
| 4,606,766 A | 8/1986 | Genik-Sas-Berezowsky et al. |
| 4,610,724 A | 9/1986 | Weir et al. |
| 4,615,731 A | 10/1986 | Thomas et al. |
| 4,629,502 A | 12/1986 | Sherman et al. |
| 4,632,701 A | 12/1986 | Genik-Sas-Berezowsky et al. |
| 4,647,307 A | 3/1987 | Raudsepp et al. |
| 4,654,078 A | 3/1987 | Perez et al. |
| 4,661,321 A | 4/1987 | Byrd et al. |
| 4,723,998 A | 2/1988 | O'Neil |
| 4,738,718 A | 4/1988 | Bakshani et al. |
| 4,765,827 A | 8/1988 | Clough et al. |
| 4,801,329 A | 1/1989 | Clough et al. |
| 4,816,235 A | 3/1989 | Pesic |
| 4,902,345 A | 2/1990 | Ball et al. |
| 4,923,510 A | 5/1990 | Ramadorai et al. |
| 4,925,485 A | 5/1990 | Schulze |
| 4,968,008 A | 11/1990 | Emmett, Jr. et al. |
| 4,974,816 A | 12/1990 | Emmett, Jr. et al. |
| 4,979,987 A | 12/1990 | Mason et al. |
| 5,046,587 A | 9/1991 | Jones |
| 5,071,477 A | 12/1991 | Thomas et al. |
| 5,127,942 A | 7/1992 | Brierley et al. |
| 5,136,784 A | 8/1992 | Marantz |
| 5,159,761 A | 11/1992 | Cagan et al. |
| 5,215,575 A | 6/1993 | Butler |
| 5,223,024 A | 6/1993 | Jones |
| 5,232,491 A | 8/1993 | Corrans et al. |
| 5,236,492 A | 8/1993 | Shaw et al. |
| 5,256,189 A | 10/1993 | Patel et al. |
| 5,354,359 A | 10/1994 | Wan et al. |
| 5,458,315 A | 10/1995 | Blatz et al. |
| 5,488,779 A | 2/1996 | Schultheis et al. |
| 5,489,326 A | 2/1996 | Thomas et al. |
| 5,535,992 A | 7/1996 | Krause |
| 5,536,297 A | 7/1996 | Marchbank et al. |
| 5,536,480 A | 7/1996 | Simmons |
| 5,575,981 A | 11/1996 | Krause |
| 5,610,575 A | 3/1997 | Gioutsos |
| 5,698,170 A | 12/1997 | King |
| 5,717,116 A | 2/1998 | Saito et al. |
| 5,855,858 A | 1/1999 | Jones |
| 5,902,474 A | 5/1999 | Jones |
| 5,919,674 A | 7/1999 | Tunley |
| 5,956,260 A | 9/1999 | Heger et al. |
| 6,002,974 A | 12/1999 | Schiffmann |
| 6,183,706 B1 | 2/2001 | King |
| D444,286 S | 6/2001 | Ahne |
| 6,268,794 B1 | 7/2001 | Tzanev |
| 6,368,381 B1 | 4/2002 | King et al. |
| 6,395,063 B1 | 5/2002 | Cole |
| 6,456,194 B1 | 9/2002 | Carlson et al. |
| 6,497,745 B2 | 12/2002 | Marsden et al. |
| 6,526,668 B1 | 3/2003 | Harrell et al. |
| 6,641,642 B2 | 11/2003 | Simmons et al. |
| 6,660,059 B2 | 12/2003 | Ji et al. |
| 6,836,972 B2 | 1/2005 | Drahos et al. |
| 7,033,480 B2 | 4/2006 | King |
| 7,040,603 B1 | 5/2006 | Tai |
| 7,066,983 B2 | 6/2006 | Ji et al. |
| 7,226,057 B2 | 6/2007 | Eichhorn et al. |
| 7,285,256 B2 * | 10/2007 | Wan et al. .................... 423/22 |
| 7,329,396 B2 | 2/2008 | Harris et al. |

| | | | |
|---|---|---|---|
| 2003/0136225 | A1* | 7/2003 | Simmons et al. .............. 75/743 |
| 2004/0115108 | A1 | 6/2004 | Hackl et al. |
| 2004/0206207 | A1 | 10/2004 | Ji et al. |
| 2006/0228279 | A1 | 10/2006 | Campbell et al. |
| 2007/0022843 | A1 | 2/2007 | Bax et al. |
| 2007/0089566 | A1 | 4/2007 | Hackl et al. |

FOREIGN PATENT DOCUMENTS

| | | |
|---|---|---|
| CL | 2998-01 | 4/2002 |
| CL | 278-02 | 11/2002 |
| CL | 1045-04 | 6/2005 |
| DE | 4336922 | 5/1995 |
| EP | 0430813 | 6/1991 |
| GB | 1491651 | 11/1977 |
| GB | 1491851 | 11/1977 |
| WO | WO 91/11539 | 8/1991 |
| WO | WO 02/070756 | 9/2002 |
| WO | WO 03/060172 | 7/2003 |
| WO | 2005042790 A1 | 5/2005 |

OTHER PUBLICATIONS

U.S. Appl. No. 11/558,639, filed Nov. 10, 2006, Choi.

U.S. Appl. No. 11/686,165, filed Mar. 14, 2007, Ji.

EKATO Pamphlet; "Mixing Update for Gassing Applications: EKATO's Self-Aspirating Impeller System"; 2 pages, which is believed to have been published in 1997.

Weir et al.; "Precious metals recovery from pressure oxidized Porgera concentrates"; Minerals and Metallurgical Processing, Nov. 1986, 3 pages.

U.S. Appl. No. 11/761,103, filed Jun. 11, 2007, Choi.

"Final Results From Farallon's Metallurgical Test Program Confirm Precious Metals Recoveries For Campo Morado", available at farallonresources.com/i/pdf/FAN_2005-12-15_NR.pdf, Dec. 15, 2005, 7 pages.

Peacey et al. "Copper Hydrometallury—Current Status, Preliminary Economics, Future Direction and Positioning versus Smelting", available at http://www.hatch.ca/non_ferrous/articles/copper_hydrometallurgy.pdf, printed May 17, 2007, 32 pages.

International Preliminary Report on Patentability for International (PCT) Patent Application No. PCT/CA2005/001873, issued Jun. 26, 2007.

Performance of a New Automatic Carbon Dioxide Coulometer; by E. W. D. Huffman, Jr., Microchemical Jr. 22, pp. 567-573.

Manual of Analytical Methods for the Uranium Concentrating Plant; by J. C. Ingles, Mines Branch Monograph 866, Mines Branch, Department of Mines and Technical Surveys, Ottawa, Canada, 1958, pp. 1-10.

The Sepon Copper Project: Development Of A Flowsheet; by K. Baxter, D. Dreisinger and G. Pratt; vol. 2: Electrometallurgy and Environmental Hydrometallurgy, TMS (The Minerals, Metals & Materials Society), 2003.

Testing and Modelling a Novel Iron Control Concept in a Two-Stage Ferric Leach/Pressure Oxidation Process for the Sepon Copper Project; by K. G. Baxter, A. G. Pavilides, and D. G. Dixon, Pressure Hydrometallurgy 2004, $34^{th}$ Annual Hydrometallurgy Meeting, Banff, Alberta, Canada.

Increasing the Capacity of Existing and New Exothermic Autoclave Circuits; by G. M. Dunn and H. W. Scriba, Pressure Hydrometallurgy 2004, $34^{th}$ Annual Hydrometallurgy Meeting, Banff, Alberta, Canada.

High Temperature POX of Precious/Base Metal Concentrates From Newmont's Phoenix Project, Using Controlled Precipitation of Sulphate Species to Enhance Silver Recovery; by G. L. Simmons and J. C. Gathje, Pressure Hydrometallurgy 2004, $34^{th}$ Annual Hydrometallurgy Meeting, Banff, Alberta, Canada.

Gold & Resource Developments Macraes Gold Project Pressure Oxidation Plant Designed and Constructed by Minproc; MGP Tech Flyer.

Design & Commissioning of the Macres Pressure Oxidation Circuit; by T. Giraudo, M. D. Cadzow, D. J. Lunt and T. W. Quaife, paper presented at Randol, 2000, Vancouver, Canada, Apr. 2000.

Sage Mill Patent Turns Waste to Ore; by L. W. Cope, ESMJ, Jan. 1998.

Process Principles in Minerals and Materials Production; by P. C. Hayes, Hayes Publishing Co., 52 Dewar Terrace, Sherwood, Queensland, 4075, Australia.

Examination Report for Chilean Patent Application No. 3349-2005, mailed Jun. 20, 2007.

ARIPO's Examination Report and Form No. 21 for ARIPO Patent Application No. AP/P/2007/004035, dated Sep. 24, 2008.

Translation of Official Letter issued in Eurasian Regional Phase of PCT/CA2005/001873, date unknown.

* cited by examiner

REDUCTION OF LIME CONSUMPTION WHEN TREATING REFRACTOR GOLD ORES OR CONCENTRATES

CROSS REFERENCE TO RELATED APPLICATION

The present application claims the benefits of U.S. Provisional Application Ser. Nos. 60/638,685, filed Dec. 22, 2004, and 60/678,001, filed May 4, 2005, each entitled of the same title, which is incorporated herein by this reference.

FIELD OF THE INVENTION

The present invention relates generally to recovery of precious metals from sulphidic materials and particularly to controlling the formation of basic iron sulphate and/or jarosites when pressure oxidizing precious metal-containing sulphide feed materials.

BACKGROUND OF THE INVENTION

As precious metal deposits, particularly gold, become scarcer, mining companies are being forced to exploit refractory precious metal deposits. Typically, gold ores and concentrates are processed using cyanide leaching to dissolve the contained gold. When the cyanide leaching efficiency (i.e., gold recovery) is low, the gold ores and concentrates are called refractory. Often, gold ores/concentrates are refractory because the gold is so finely distributed or as solid solution in a sulphide mineral matrix and/or because of the presence of gold-absorbing carbonaceous materials, and/or because of the presence of cyanicides such as copper oxide and secondary copper sulphide minerals. In refractory sulphide minerals, the gold-bearing sulphides are typically chalcopyrite, pyrite and arsenopyrite. When gold is present as solid solution in a sulphide, no reasonable amount of grinding will liberate the gold from its matrix and make it accessible to cyanide leaching. To render gold sulphide materials amenable to cyanide leaching, the sulphide matrix must be destroyed.

In one method, the sulphide matrix is destroyed through biological oxidation. Sulphide and iron oxidizing microbes (most commonly *Thiobaccilus Ferrooxidans* and *Thiobacillus-Thiooxidans*) are used. The microbes are blended in a pulp or a heap with the sulphide minerals. Under bacterial activity, the sulphide minerals are oxidized until the precious metal is freed from the sulphide matrix. The oxidized minerals are then subjected to cyanide leaching to solubilize the gold. The solubilized gold may thereafter be readily recovered by a variety of techniques.

In other methods, the sulphide matrix is destroyed through chemical oxidation. In one chemical oxidation technique, the gold-bearing sulphide minerals are oxidized or calcined or microwaved in a furnace at high temperatures (450-750° C.), in an oxidizing environment. The resulting oxidized product (calcine) can be leached successfully with cyanide. In another chemical oxidation technique, called pressure oxidation, the gold-bearing sulphide minerals are oxidized in an autoclave at high temperature (190-230° C.) and super atmospheric pressure, while injecting oxygen gas through the pulp. For both the bacterial oxidation and pressure oxidation processes, it is necessary to wash for removal of acid and dissolved metals and then neutralize the resulting pulps prior to cyanidation, which is usually carried out at a pH between about pH 9.0 and pH 11.0.

Pressure oxidation reactions for gold bearing sulphide minerals (pyrite $FeS_2$ and arsenopyrite FeAsS) can be written ideally as:

$$4FeS_2 + 15O_2 + 8H_2O \rightarrow 2Fe_2O_3 + 8H_2SO_4$$

and $$2FeAsS + 7O_2 + 6H_2O \rightarrow 2FeAsO_4 \cdot 2H_2O + 2H_2SO_4$$

Small amounts of iron and arsenic in the sulphide materials are also converted to the dissolved ferrous iron, ferric iron, arsenite and arsenate. Under these conditions, iron is precipitated in the autoclave as hematite ($Fe_2O_3$) and scorodite ($FeAsO_4 \cdot 2H_2O$), and sulphuric acid is generated in solution. These two iron compounds are very desirable because they are chemically stable. It is possible to form other stable Fe—As compounds in the autoclave, depending on the temperature, the Fe/As ratio and the acidity in the autoclave liquor. Because of their chemical stability, these compounds are inert during the subsequent neutralization and cyanidation steps and, therefore, do not consume expensive chemicals, such as lime.

Unfortunately, depending on the chemical conditions prevailing in the autoclave, other less desirable iron compounds can be formed. One such compound is basic iron sulphate, $FeOHSO_4$. Another fairly unstable compound that can form is jarosite. The chemical formula for hydronium jarosite is $(H_3O)Fe_3(SO_4)_2(OH)_6$. Other jarosites are also frequently encountered (where the hydronium ion, $(H_3O)^+$ is replaced with $Na^+$, $K^+$, $NH_4^+$, $½Pb^{2+}$, $Ag^+$).

Jarosites and basic iron sulphates can be chemically instable. For example, in the autoclave discharge, basic iron sulphate can react with lime during pre-cyanidation neutralization to form ferric hydroxide and calcium sulphate:

$$FeOHSO_4 + Ca(OH)_2 + 2H_2O = Fe(OH)_3 + CaSO_4 \cdot 2H_2O$$

Also, some jarosites, particularly hydronium jarosite, react with lime during pre-cyanidation neutralization, to form ferric hydroxide and calcium sulphate:

$$(H_3O)Fe_3(SO_4)_2(OH)_6 + 2H_2O + 2Ca(OH)_2 \rightarrow 3Fe(OH)_3 + 2CaSO_4 \cdot 2H_2O$$

The instability of basic iron sulphates and jarosites can have a significant economic impact on precious metal operations. When hematite is formed, all the sulphide sulphur in the original autoclave feed ends up as free sulphuric acid and dissolved metal sulphates in solution, and as solid, chemically stable and inert calcium sulphate (if calcite and/or other calcium containing minerals are present in the feed). Therefore, neutralization of the free acid and dissolved sulphate salts in the discharge from the autoclave can be achieved with limestone ($CaCO_3$), which is normally a very cheap reagent. When basic iron sulphate and/or hydronium jarosite is formed during pressure oxidation on the other hand, a significant amount of the basic iron sulphate and jarosite is precipitated and cannot be separated from the precious metal-containing solids. When the solids are neutralized before cyanidation, the basic iron sulphate and jarosite solids are stable in the presence of limestone. The neutralization of basic iron sulphate and jarosite can only be done with stronger but much more expensive neutralization agents, such as lime, CaO, or sodium hydroxide, NaOH, etc. Although jarosite commonly reacts at ambient temperature slowly with such acid neutralizing agents, basic iron sulphate reacts rapidly with the neutralizing agents and can require a large quantity of neutralizing agents to raise the slurry pH to a level suitable for cyanide leaching of precious metals. Therefore, to save on operating costs, it is important to use oxidation conditions disfavoring the formation of basic iron sulphate and to a lesser extent hydronium jarosite and favoring the formation of hematite.

Reaction conditions favoring hematite formation and disfavoring basic iron sulphate and jarosite formation are well known in the literature. For example, higher autoclave slurry temperatures and lower sulphuric acid concentrations favor hematite formation. But the slurry temperature and sulphuric acid concentration of a pressure oxidation process are usually dictated by other constraints (e.g., the rate of sulphide oxidation, the size of the autoclave, the total pressure of the autoclave and the economic requirement for autothermal conditions in the autoclave etc.).

The presence of certain substances is known to affect the formation of basic iron sulphate, jarosite and hematite. While high concentrations of certain cations in the autoclave liquor (in particular monovalent ions such as $(H_3O)^+$, $NH_4^+$, $Na^+$, $K^+$ and $Ag^+$) normally favor jarosite formation, the presence of divalent metal sulphates in the autoclave liquor (i.e. $ZnSO_4$, $CuSO_4$, $MgSO_4$, $MnSO_4$, etc.), normally favors hematite formation, by lowering the activity of the hydrogen ion. When already present, hematite acts as a seed material that favors continued hematite formation and disfavors basic iron sulphate and jarosite formation.

The factor normally having the greatest impact on the form of the iron species produced in the autoclave is the acidity of the slurry, with high acidity favoring basic iron sulphate and jarosite formation and low acidity favoring hematite formation. Therefore, to form hematite, or even to convert basic iron sulphate or hydronium jarosite to hematite in the autoclave, it is well known that (at a given temperature) acidity control is important.

There are two primary ways to control acidity in the autoclave, namely dilution of the pulp and consumption of some of the acid in the reactor. In the former case, the volume of the pulp is increased while maintaining the number of moles of acid relatively constant$_{[/1]}$. In the latter case, the volume of the pulp is maintained constant but the number of moles of acid decreased by the addition of neutralizing agents directly to the autoclave.

Dilution is normally effected by adding water to the pulp, thereby lowering the acid concentration and raising the pH. Increasing the dilution of the feed slurry can substantially increase capital costs. Autoclave vessels must be larger for a given ore throughput, and increased dilution also increases the operating costs when dilution of the heat of reaction is excessive and beyond autogenous operations.

Acid consumption can be performed by numerous techniques. It is known to add zinc oxide or any other bases to control acidity and favor the formation of hematite over jarosite. It is known to add limestone ($CaCO_3$) to improve silver recovery, by consuming acid in the autoclave and promoting the formation of hematite over silver jarosite. The recommended limestone addition rates were between 0.50 and 1.67 ($CO_3$/S w/w). It is also known to use ammonia ($NH_3$ or $NH_4OH$) to convert jarosite to hematite, with a molar ratio of $NH_3$/S greater than 2 being preferred. As in the case of dilution, the addition of acid consuming or neutralizing agents increases operating costs because of reagent costs. If the cheapest base limestone ($CaCO_3$) is used, operating costs increase due to carbon dioxide ($CO_2$) evolution in the autoclave, which results in higher venting from the autoclave to remove the $CO_2$ that is formed by the reaction of limestone with sulphuric acid and/or the dissolved metal sulphates. Excessive venting wastes oxygen and upsets the heat balance in the autoclave. It would be desirable to achieve the objective of promoting the formation of hematite over basic iron sulphate and/or hydronium jarosite without incurring a significant increase in capital and/or operating costs.

SUMMARY OF THE INVENTION

These and other needs are addressed by the various embodiments and configurations of the present invention. The present invention is directed generally to controlling the levels of basic ferric sulphates and/or jarosites at various points in a precious metal recovery process.

In one embodiment of the present invention, a process is provided that includes the steps of:

(a) oxidizing an aqueous feed slurry in an autoclave;

(b) removing, from the autoclave, an aqueous discharge slurry comprising discharge solids and aqueous discharge liquid;

(c) allowing most, if not all, of iron-containing precipitates in the aqueous discharge solids to react with acid in the aqueous discharge liquid to form dissolved iron compounds;

(d) thereafter, separating the aqueous discharge liquid from the discharge solids;

(e) contacting the separated discharge solids with an acid consumer;

(f) leaching, under alkaline (or basic) conditions, the precious metal from the discharge solids to form a solubilized precious metal; and (g) recovering the solubilized precious metal.

As used herein, "autoclave" refers to any reactor that effects oxidation of a reactant under superatmospheric conditions; "reactive iron-containing precipitate" to an iron sulphate-containing precipitate, or solid phase iron species, that is reactive with an acid consumer, such as lime and/or limestone, and specifically includes basic iron sulphate and jarosite; and "acid consumer" to any material that reacts with sulphuric acid. It includes bases or any molecular or ionic substance that can combine with a proton (hydrogen ion) to form a new compound. Commonly, a base reacts with (neutralizes) acids to form salts and often water. A mole of an acid consumer is defined as that amount which reacts with (consumes) one mole of sulphuric acid. The "moles of total acid consumers" is the sum of the moles of all acid consumers present. Exemplary classes of acid consumers include carbonates, oxides and hydroxides of metals. Acid consumers are commonly compounded with sodium, potassium, magnesium, and calcium. Specific examples of acid consumers include carbonates, such as limestone, soda ash, trona, dolomite, and calcite; metal oxides such as lime, zinc oxide, magnesium oxide; hydroxides such as sodium hydroxide, potassium hydroxide, ammonia, ferric hydroxide, laterite, limonite, goethite, gibbsite, and diaspore and various clays.

It has been found that basic iron sulphate formed and precipitated during pressure oxidation is generally highly unstable in hot sulphuric acid solution, particularly at atmospheric pressure, and that basic iron sulphate precipitates react with sulphuric acid to form the dissolved ferric sulphate according to the following equation:

$$2FeOHSO_4 + H_2SO_4 \rightarrow Fe_2(SO_4)_3 + 2H_2O$$

The ferric sulphate, $Fe_2(SO_4)_3$, is dissolved in the autoclave discharge liquor and therefore readily separable from the discharge solids. The negative effect of basic iron sulphate formation on process operating costs can be mitigated by providing the components of the hot discharge slurry from the autoclave with a sufficient time to react and form solubilized ferric sulphate. Whilst basic iron sulphate is quite inert to neutralization with limestone, solubilized ferric sulphate reacts readily with limestone. Allowing time for basic iron sulphate to convert to dissolved ferric sulphate therefore can reduce the consumption of expensive lime in the neutralization reaction of cyanidation feed in favor of inexpensive limestone.

A further benefit of allowing the various components of the autoclave discharge time to react with one another is that a strong ferric sulphate solution can be produced, which can be recovered by solid/liquid separation techniques and recycled to pre-treat the feed to the autoclave. Ferric ions in the recycled solution react with and oxidize sulphides in the autoclave feed material, thereby reducing the requirement for expensive oxygen in the autoclave process. In addition, any remaining acid in the recycle solution will react with carbonate minerals if present in the autoclave feed material, thereby reducing the formation of carbon dioxide inside the autoclave and further improving the utilization of oxygen.

In a second embodiment of the present invention, a precious metal recovery process is provided that includes the steps:

(a) inputting a precious metal-containing feed slurry into a first compartment of a multi-compartment autoclave;

(b) providing, in the first compartment, a first oxygen mass transfer rate and/or a first temperature of the feed slurry to control (e.g., slow) a rate of sulphide sulphur oxidation;

(c) inputting the feed slurry into a downstream compartment of the autoclave;

(d) providing, in the downstream compartment, a second oxygen mass transfer rate and/or a second temperature of the feed slurry, with one or both of the following being true:
  (i) the first oxygen mass transfer rate is at least $10_{[H2]}\%$ less than in a conventional autoclave; and
  (ii) the first temperature is at least about 10 degrees Celsius lower than the second temperature;

(e) removing, from the autoclave, an aqueous discharge slurry including discharge solids and aqueous discharge liquid;

(f) separating and washing the discharge solids from the discharge liquid (g) contacting the discharge solids with an acid consumer to consume at least a portion of the remaining sulphuric acid and dissolved metal sulphates; and (h) contacting a lixiviant, at a pH above 7, with the discharge solids to solubilize at least most of the precious metals; and (i) recovering the solubilized precious metal.

As used herein, a "compartment" refers to a delineated portion of the autoclave in which the slurried contents are at least substantially free of intermixing with the slurried contents of another compartment.

In this embodiment, selected compartments of the multi-compartment autoclave are preferably operated under conditions that favor the formation of hematite. Instead of relying on excessive dilution of the slurry or neutralization of the acid using large quantities of an acid consumer, it has been found that the level of sulphuric acid in the first and/or second autoclave compartments/stages can be lowered by slowing down the rate of the oxidation reaction that produces the acid, i.e., the sulphide sulphur oxidation reaction. By doing so, the acid level in the first compartment/stage can be maintained at a relatively low level, so that when fresh feed slurry is pumped into the autoclave, it encounters the low-acid environment. Under these conditions, hematite formation is favored when iron starts precipitating. Because hematite is more thermodynamically stable than basic iron sulphate and jarosite and because new hematite particles will preferentially precipitate on an existing hematite surface (a phenomenon known as seeding), the continuing formation of hematite is favored when the remaining sulphides are oxidized in the subsequent compartments/stages of the autoclave (even though the acid concentration increases substantially in the latter autoclave compartments/stages to a level that favors thermodynamically the formation of basic iron sulphate and/or jarosite). In other words, suboptimal oxidation conditions for acid formation can be used in the first few autoclave compartments while optimal or near optimal oxidation conditions can be used in the latter autoclave compartments without precipitating significantly increased levels of basic iron sulphates and jarosites. When hematite is the main precipitation product, lime consumption during the subsequent neutralization of cyanidation feed and operating costs can be lowered substantially.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, and A, B or C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

An embodiment of a process of the present invention will be discussed with reference to FIGS. 1A-1B. As will be appreciated, the concepts of the present invention can be used in an endless number of other processes and such processes are considered to fall within the scope of the present invention.

Figure 1A:
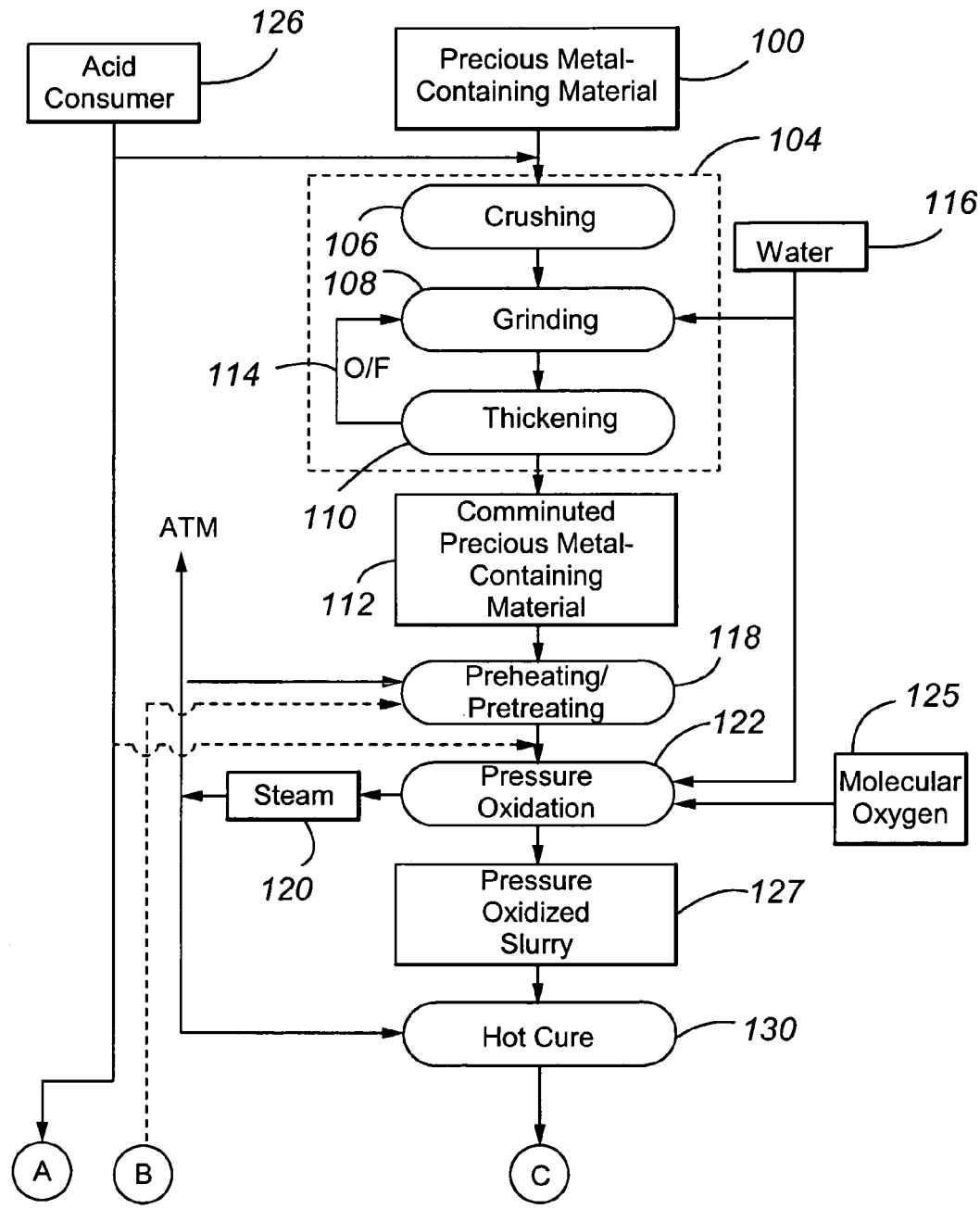
FIG. 1 is a flow chart of an embodiment of a precious metal recovery process according to an embodiment of the present invention.
Figure 1B:
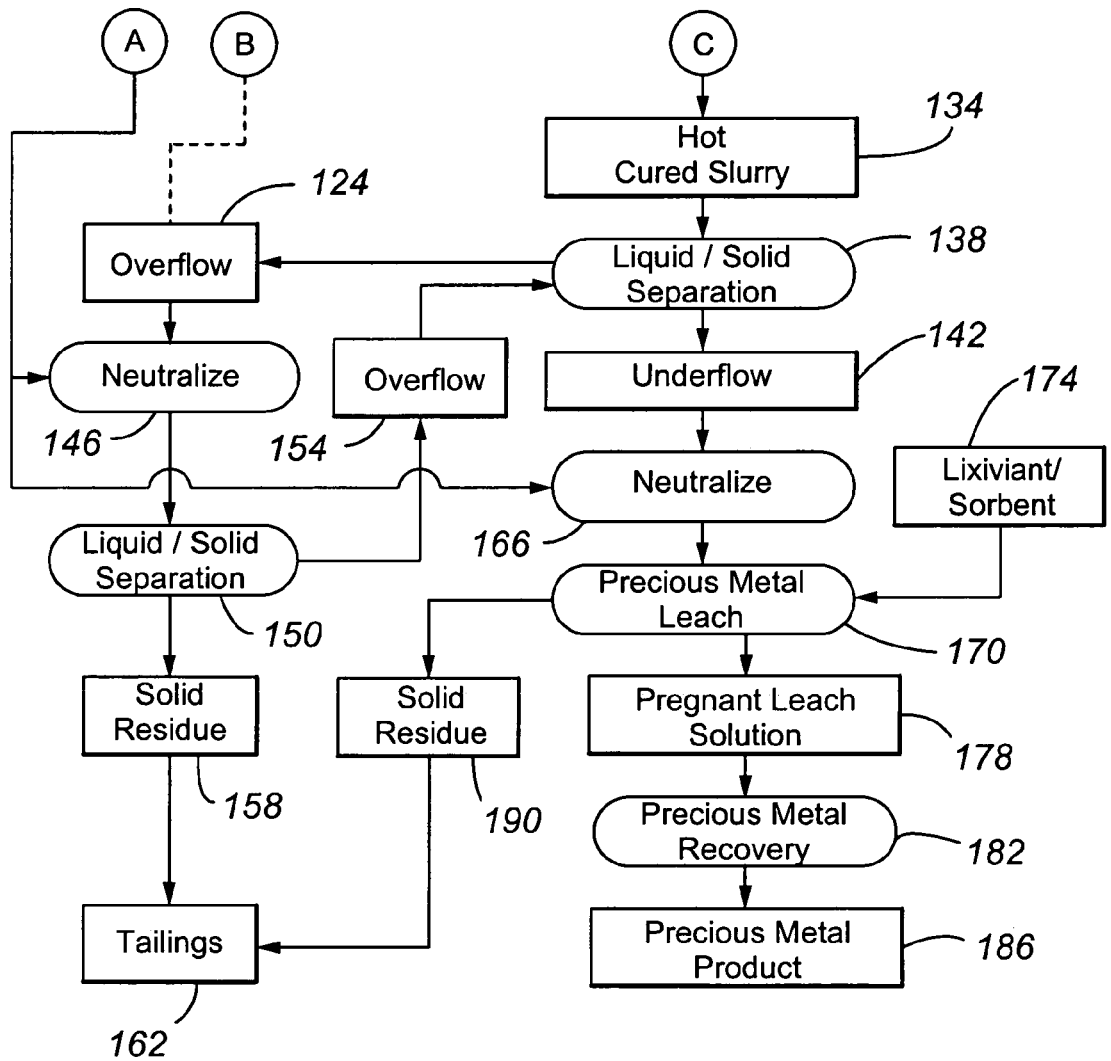

With reference to FIG. 1A, a precious metal-containing material 100 is provided to a comminution circuit 104 and comminuted to a $P_{80}$ size ranging from about 100 to about 600 mesh (Tyler).

The material 100 is a refractory sulphide material, typically including from about 2 to about 60 wt. % sulphide minerals, from about 1 to about 500 grams/tonne silver, and from about 1 to about 100 grams/tonne gold. Commonly, the sulphide minerals are predominantly pyrite, realgar, orpiment, chalcopyrite and arsenopyrite, with minor amounts of enargite, pyrrhotite, sphalerite, galena, stibnite, cinnabar, covellite, chalcocite and other commonly occurring sulphide minerals.

The comminution circuit 104 typically includes the steps of crushing 106, grinding 108, and thickening 110 to produce a slurried comminuted precious metal-containing material 112, that is typically from about 30 to about 60 wt. % solids. The overflow 114 from the thickening circuit (which is primarily water) is recycled back to the grinding step for reuse. Additional water 116 is added to the grinding device (which is typically a Semi-Autogeneous or SAG, ball mill, high pressure grinding roll or HPGR, or rod mill, or combination of thereof) as needed to provide the desired liquid fraction to the slurry outputted by the grinding step 108. For a low sulphide containing material, flotation may be incorporated after grinding 108 to increase the sulphur content in the autoclave feed. As will be appreciated, there are a large number of other comminution circuit designs and/or components that can be used in the process of the present invention.

The comminuted precious metal-containing material 112 is subjected to a preheating step 118 when processing low-sulphur feeds, in which steam 120 from pressure oxidation 122 is contacted with the material 112 to preheat the material 112 before pressure oxidation 122. Preferably, the material 112 is heated to a temperature of from about 30 to about 95 degrees Celsius with single-stage heating before being inputted to pressure oxidation 122.

Optionally, overflow 124 from the liquid/solid separation step 138 can be recycled and contacted with the material 112 during the preheating/pretreating step 118 to reduce the consumption of oxygen and the production of sulphuric acid in the autoclave during oxidation of the sulphides. The recycled overflow 124 contains dissolved ferric sulphate and free sulphuric acid. The ferric ions and sulphuric acid react with the sulphides in the material 112 to partially oxidize the sulphides and neutralize any carbonates, thereby reducing the consumption of oxygen and the production of sulphuric acid by the remaining sulphides in the autoclave. An added benefit of this aspect of the invention is the reaction that occurs between any remaining sulphuric acid in the recycle liquor and acid-consuming carbonate minerals in the sulphide feed material. By neutralizing some of the carbonate minerals before introduction into the autoclave, the evolution of carbon dioxide in the autoclave is reduced, thereby further improving the utilization of oxygen. Any remaining free sulphuric acid after the preheating/pretreatment step 118, as well as any ferric sulphate and ferrous sulphate in solution, should then most preferably be neutralized with an acid consumer 126, preferably inexpensive limestone, to precipitate ferric hydroxide and gypsum before the feed material enters the autoclave. Preferably, the total acid consumer [expressed as carbonate equivalent in mole] to sulphide molar ratio is no more than 0.26 and more preferably ranges from about 0.10 to about 0.225. Alternatively, a solid/liquid separation circuit (not shown) with and/or without washing can be used to separate (at least) most of the liquid phase, which contains dissolved ferrous sulphate, residual dissolved ferric sulphate and residual free acid, etc., from the solid phase. The thickened slurry (or solid phase) can then be used as the autoclave feed slurry.

As will be appreciated, hematite seed material may be introduced from a source other than the pressure oxidation step. Hematite may be obtained from other sources, comminuted to the size range of the precious metal-containing material, and added to the material 112 before pressure oxidation. As noted, hematite particles act as a "seed" that promotes further hematite formation.

Figure 2:
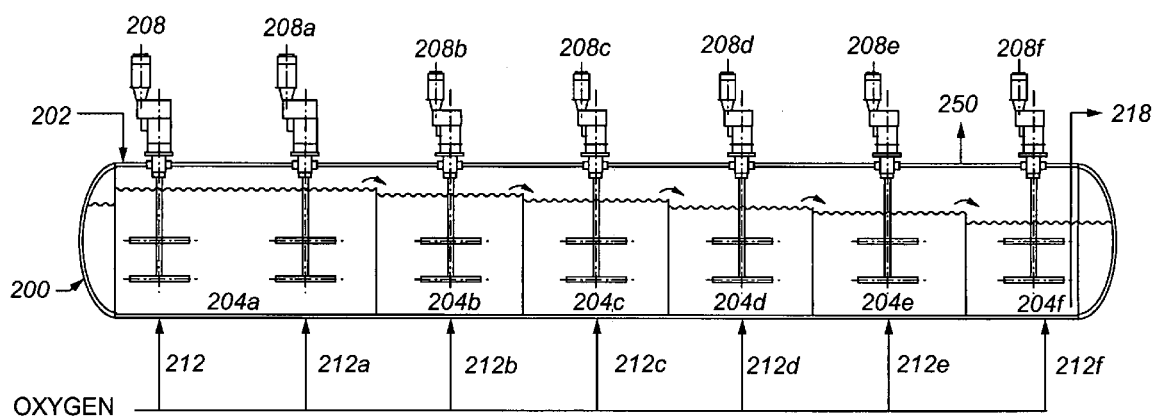
FIG. 2 is a cross-sectional view of a first autoclave configuration.
Figure 3:
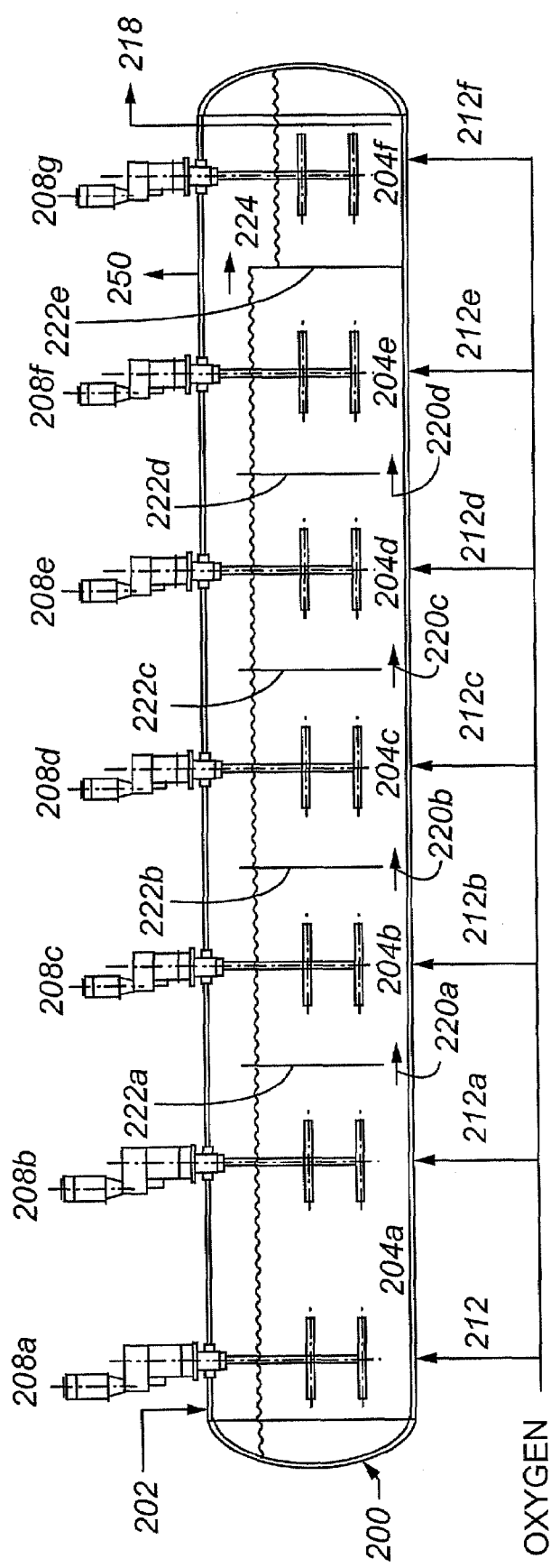
FIG. 3 is a cross-sectional view of a second autoclave configuration.

The material 112, after the preheating/pretreating step 118, is inputted as a feed slurry into a multi-compartment autoclave, such as one of the autoclave configurations of FIGS. 2 and 3, to pressure oxidize at least most and more preferably at least about 90% of the sulphides in the material 112. With reference to FIGS. 2 and 3, the preheated and pretreated material 202 is introduced into the first compartment 204a of the autoclave 200. Although the autoclave is shown for illustration purposes as having only six compartments 204a-f, it is to be understood that the autoclave will typically have at least six compartments to minimize short circuiting of the feed slurry 118 to the pressure oxidized slurry 127 as can occur in autoclaves with fewer compartments. Short circuiting reduces the degree of completion of the pressure oxidation reactions. Excess gas, including components such as carbon dioxide, oxygen, nitrogen, and argon, is vented through a vent 250. As will be appreciated, the autoclave atmosphere typically contains at least about 80% steam, 10% molecular oxygen, and 10% inert gases. Each compartment 204 includes one or more agitators 208a-f and sparge tubes 212a-f for introducing molecular oxygen 125. As will be appreciated, the autoclave can have any number of compartments and be of any suitable design, including a stacked or vertical autoclave design. Cooling water (not shown) can be added to the various compartments to maintain desired slurry temperatures. Preferably, no more than about 1% of the precious metal in the slurry 118 is solubilized into the liquid phase of the pressure oxidized slurry 127 during pressure oxidation.

The autoclaves of FIGS. 2 and 3 differ in that the autoclave of FIG. 2 is an overflow autoclave while that of FIG. 3 is an underflow autoclave. With reference to FIG. 3, the valuable metal-containing feed slurry is introduced into the first compartment 204a of a multi-compartment autoclave 200. The valuable metal-containing feed slurry comprises sulphide sulphur. The sulphide sulphur is at least partially oxidized in the first compartment 204a to form a first oxidized slurry. The multi-compartment autoclave 200 contains a plurality of weirs 222 (a)-(e) which separate a plurality of adjacent autoclave compartments 204(a)-(f). It is understood that the autoclave can have any number of compartments and weirs. Slurry is not permitted for flow over the upper portion of the first weir 222a. The lower portion of the first weir 222a comprises a lower passageway 220a to allow slurry to flow from an upstream compartment to a downstream compartment. The lower portion of the final weir 222e does not permit slurry to flow; however, slurry is allowed to flow through the upper passageway 224 of the final weir 222e. For example, the valuable metal-containing feed slurry is introduced into the first compartment 204a where it is at least partially oxidized to form a first oxidized slurry. The slurry is transferred into the second compartment 204b by means of the lower passageway 220a of the lower portion of the first weir 222a. The slurry continues to travel to downstream compartments by the lower passageways 220(a)-(d) until the slurry reaches the compartment adjacent to the final compartment 204e. The slurry reaches the final compartment 204f by means of the upper passageway 224 of the final weir 222e. A valuable metal is then recovered from a slurry output by the final compartment 204(f) of the multi-compartment autoclave 200.

The autoclave 200 is preferably operated under conditions to promote hematite formation in the first one and/or two compartments 204a,b of the multi-compartment autoclave 200. Desirably, hematite formation is promoted by maintaining the sulphuric acid concentration in the first compartment at a relatively low level. Once formed, hematite provides a favorable nucleation site for further hematite formation and suppresses formation and precipitation of basic iron sulphate and jarosite in downstream compartments 204c-f of the autoclave. The acid level is controlled in the initial autoclave compartment by operating the autoclave 200 to provide a lower sulphide oxidation rate. The oxidation rate is controlled by controlling mixing energy input, slurry temperature, oxygen mass transfer rate, and/or dissolved molecular oxygen in the first compartment 204a. Briefly stated, the extent of the sulphide oxidation reaction in the first compartment of a multi-compartment vessel is limited, thereby suppressing sulphuric acid production, to favor formation of hematite over one or more other sulphate-containing iron products. Preferably, in the first autoclave compartment 204a no more than about 70% and even more preferably from about 25 to about 60% of the sulphides are oxidized. In a conventional autoclave by contrast, the degree of sulphur oxidation in the first autoclave compartment is maximized and at least 70% of the sulphides are oxidized in the first autoclave compartment.

The preferred operating conditions in the first autoclave compartment to yield the desired oxidation rate of sulphides include a total acid concentration ranging from about 5 to about 30 g/l and a temperature ranging from about 160 to about 220 degrees Celsius. Rather than relying entirely on dilution and/or acid neutralization to achieve the preferred acid concentration, the molecular oxygen addition rate and degree of agitation in the first compartment are carefully regulated to control the molecular oxygen mass transfer rate and are appreciably less than those in a conventional autoclave.

These conditions will generally be different from those in the downstream compartments. While not wishing to be bound by any theory, it is believed that in the downstream compartments, sulphur oxidation rates can be optimized as the formation of hematite in the first few autoclave compartments fosters the continued formation of hematite in the downstream compartments notwithstanding the compartment slurry temperature and acid content. The slurry temperature in the first compartment 204a will typically be at least about 5 degrees Celsius, more typically at least about 10 degrees Celsius and even more typically from about 10 to about 30 degrees Celsius less than the slurry temperature in the last several autoclave compartments 204c-f, and the acid concentration in the first compartment 204a will typically be less than and more typically at least about 5 g/l less than the acid concentration in the last several compartments. As will be appreciated, the autoclave temperature in the downstream autoclave compartments typically ranges from about 180 degrees Celsius to about 230 degrees Celsius. Compared to conventional autoclaves, the lower molecular oxygen mass transfer rates in the first autoclave compartment can be effected by one or more of introducing less molecular oxygen into the first compartment 204a through the sparge tube 212a compared to the downstream compartments, using a slower rate or speed of rotation of the agitator 208 to provide lower shear in the first compartment and/or using different types or designs of agitators that provide lower shear.

The residence time in the first compartment of the autoclave vessel preferably ranges from 15 to 40 percent of the total residence time in the autoclave. The average total residence time in the autoclave typically ranges from about 0.75 to about 2 hours.

In an alternative configuration(s), techniques, in addition to those used above, are used to control the acid concentration/production rate in the first autoclave compartment. In one configuration, acid consumers 126 (having a similar size distribution to the slurried precious metal-containing material) are added to the first autoclave compartment to consume some of the sulphuric acid produced from sulphide oxidation. However, the molar ratio of total acid consumers (as equivalent CO3) to sulphides in the first compartment is preferably no more than about 0.26 molar ratio and more preferably ranges from about 0.10 and 0.225 molar ratio. The acid consumers may be added either entirely with the feed material entering the autoclave, entirely in the first compartment, or partially with the feed and partially staged throughout the first compartment of the autoclave. The acid consumer may include a value metal for later recovery. For example, the acid consumer(s) may include saprolitic or limonitic laterites, which contain the valuable metals nickel and cobalt. In another configuration, the pulp density of the feed material in the first autoclave compartment is reduced, typically to a density ranging from about 30 to about 49% (w/w).

After pressure oxidation 122, the pressure oxidized or discharge slurry 127 includes a number of components. It preferably has a free acid concentration of from about 20 to about 50 g/l and a dissolved iron concentration of least about 1 gram/liter. The iron in the slurry 127 has a variety of forms. Typically at least about 50% and even more typically from about 60 to about 99% of the iron is in the form of hematite. No more than about 50%, more typically no more than about 30%, even more typically from about 10 to about 30% of the iron is in the form of basic ferric sulphate. The slurry 127 typically includes less than 10 wt. % (dry basis) basic ferric sulphate. Most of the basic ferric sulphates and jarosites in the slurry 127 are present as precipitates.

The pressure oxidized slurry 127 can be flashed in an open vessel to release pressure and evaporatively cool the slurry 127 through release of steam to form a flashed slurry product.

To convert the (solid) basic ferric sulphates to the dissolved ferric sulphate, the solid phase of the autoclave discharge is maintained, in a hot cure step 130, at a preferred temperature of at least about 60 degrees Celsius, more preferably from about 70 to about 120 degrees Celsius, and even more preferably from about 85 to about 95 degrees Celsius, for a time sufficient for most of the basic ferric sulphates to react with the free sulphuric acid in the liquid phase of the autoclave discharge. Preferably, the slurry 127 is held in the hot cure step 130 long enough for at least most, more preferably at least about 60%, and even more preferably for at least about 80% of the basic ferric sulphates to be converted into the dissolved ferric sulphate according to the following equation:

$$2Fe(SO_4)(OH)+H_2SO_4=Fe_2(SO_4)_3+2H_2O$$

As can be seen in the above equation, the reaction between basic ferric sulphate and sulphuric acid produces the dissolved ferric sulphate, which can be separated readily from the solid phase in a solid/liquid separation circuit. Moreover, the dissolved ferric sulphate in the separated liquid phase will be readily reacted with limestone during the subsequent neutralization to produce ferric hydroxide.

The conditions in the hot cure step 130 can vary depending on the application. Typically, the slurry 127 is held in the hot cure step 130 for a time ranging from about 1 to about 24 hours. The hot cure step 130 is preferably carried out in one or more stirred tank reactors at atmospheric pressure. Although the hot cure reaction is mildly exothermic, preservation of the slurry temperature within hot curing is necessary and may require the adoption of heat conservation measures and/or need steam addition from 120 to ensure slurry temperature is within the optimal range.

After the hot cure step 130, the hot cured slurry 134 preferably includes from about 10 to about 140 g/l dissolved ferric sulphate (as $Fe_2(SO_4)_3$), no more than about 3% wt basic ferric sulphates in the solid phase, no more than about 1% jarosites in the solid phase, and from about 10 to about 40 g/l sulphuric acid. Preferably, at least about 80% of the iron contained in the hot cured slurry is in the form of dissolved ferric sulphate and no more than about 20% of the iron is in the form of basic ferric sulphate in the solid phase.

The hot cured slurry 134 is next cooled in a cooling tower from a hot cure temperature of from about 70 to about 100° C. to a temperature of from about 30 to about 50° C. and then subjected to liquid/solid separation 138 to produce an underflow 142 including (at least) most of the solid fraction and an overflow 124 including (at least) most of the liquid fraction of the slurry 134. The liquid/solid separation step 138 may be performed by any suitable techniques, including Counter Current Decantation or CCD. In liquid/solid separation 138, the liquid fraction or overflow, which contains (at least) most of the dissolved ferric iron and sulphuric acid, is separated from the precious metal-containing solid residue. The separated overflow 124 typically includes at least about 90% and more typically at least about 98% of the dissolved ferric iron in the hot cured slurry 134 or at least about 90% and more typically at least about 98% of the dissolved metal sulphates and free sulphuric acid. By contrast, the separated underflow 142 typically includes no more than about 10% and more typically no more than about 2% of the dissolved ferric iron in the hot cured slurry 134 or no more than about 10% and more typically no more than about 2% of the dissolved metal sulphates and free sulphuric acid. Typically, the overflow 124 contains no more than about 1 wt. % solids, and the underflow 142 no more than about 70 wt. % liquid.

The overflow 124 is subjected to acid neutralization 146 in which acid consumers, such as carbonate containing flotation tailing, limestone and lime, are contacted with the overflow 124 to increase the pH from a starting pH of from about pH 0.5 to about pH 1.3 to a final pH of from about pH 4.5 to about pH 10.0. The neutralized slurry at pH over 7.0 is subjected to a liquid/solid separation 150 (which is preferably done by a High Density Sludge or HDS process) to produce a further overflow or liquid fraction 154 and a solid residue 158. The neutralization step 146 is preferably performed in two stages. In the first stage, which can have multiple reactors, free flotation tailing or inexpensive limestone is contacted with the dissolved ferric sulphate and free sulphuric acid to form ferric hydroxide and gypsum. In a second stage to achieve a higher pH, typically at least about 90% of the dissolved ferric sulphate is precipitated. In the second stage which can also have multiple reactors, lime is contacted with the slurry discharged from the first stage of neutralization to reach the final pH normally above 7.0. The solid residue 158 reports to tailings impoundment area 162 while the overflow 154 is recycled to the liquid/solid separation step 138.

Returning to the liquid/solid separation step 138, the underflow 142, which preferably contains no more than about 10 wt. %, more typically no more than about 5 wt. %, and even more typically no more than about 2 wt. % total basic ferric sulphates and/or jarosites in the solid phase, is neutralized 166 using an acid consumer 126, which is preferably lime. The initial pH of the underflow 142 typically ranges from about pH 2 to about pH 5 while the final pH typically ranges from about pH 9.0 to about pH 11.0. After hot curing, it is preferable that (at least) most, and preferably at least about 98%, of the dissolved ferric iron and sulphuric acid reports to the overflow 124. This effects a substantial reduction in lime consumption in the neutralization step 166. If a lower wash efficiency is achieved in the liquid/solid separation 138, limestone can be used first in neutralization 166 prior to lime addition so that reagent costs are minimized. Acid neutralization is typically achieved by placing the underflow 142 in a stirred vessel or multiple stirred vessels and adding the acid consumer while agitating the underflow 142.

The precious metal is dissolved by leaching the neutralized underflow 142 in the precious metal leach step 170. The leaching agent or lixiviant 174 is typically alkali- or acid-based, with exemplary lixiviants being cyanide, halides (iodide, bromide, chloride), ammonium or sodium thiosulfate, and thiourea. In one configuration, the leach step 170 is performed at atmospheric pressure and under alkaline conditions (at or above a pH of about pH 7) to produce a pregnant leach solution 178 containing (at least) most of the precious metal content of the underflow 142. The precious metal leach step 170 may be done by any suitable technique including using cyanide leaching and Carbon-in-Pulp or CIP techniques, Carbon-In-Leach or CIL techniques, cementation techniques, Resin-in-Pulp or RIP techniques, Resin-In-Leach or RIL techniques, or by circulating a pregnant leach solution and/or slurry through one or more gold sorbent columns. In the CIL, CIP, RIP, RIL, and other sorbent-based techniques, a sorbent, such as activated carbon or an ion exchange resin, sorbs the precious metal dissolved in the lixiviant. The sorbed precious metal is stripped from the sorbent by an acidic or alkaline eluant to form a barren sorbent for recycle to the leach step 170 with and/or without regeneration, and a pregnant eluate containing most of the precious metal sorbed on the sorbent.

In the precious metal recovery step 182, the precious metal is recovered from the pregnant leach solution 178 (or pregnant eluate) by suitable techniques, such as electrowinning or cementation followed by smelting, to form the precious metal product 186. When required, the barren residue 190 from the leaching step 170 is subjected to cyanide detoxification or destruction and discarded as tailings 162.

EXAMPLES

Example 1

Example 1 was performed to illustrate a conventional precious metal pressure oxidation process followed by cyanidation. No attempt is made in the process to control basic iron sulphate and jarosite formation.

A refractory gold ore containing gold-bearing pyrite assayed 8.2% $S^{2-}$, 3.50 g/t Au and 33.9 g/t Ag. It was tested in a continuous pilot autoclave with a 30 L operating volume. Under typical pressure oxidation conditions (slurry temperature of about 230° C., slurry residence time of about 60 minutes, 100 psi oxygen overpressure, and a slurry content of about 30% solids), basic iron sulphate and jarosite were produced in the autoclave. The autoclave discharge solids assayed 9.7% $SO_4$. The precious metal was recovered by CIL, after the pressure oxidized solids were neutralized to a pH of pH 10.5. Recoveries were 96.0% and 80% for gold and silver, respectively, but lime consumption was very high at 77 kg CaO/t-solid. Under these conditions, sulphide sulphur oxidation in the first compartment was very high (92%), and the acid level in the first compartment was 31 g/L free $H_2SO_4$ acid.

Example 2

Example 2 also illustrates a conventional precious metal pressure oxidation process followed by cyanidation. In the process, the feed slurry was diluted in an attempt to control basic iron sulphate and jarosite formation.

The same ore as used in Example 1 was processed through the same pilot continuous autoclave. All conditions were kept the same as Example 1, with the exception that the slurry pulp density was reduced (or diluted) to about 20% solids. The autoclave discharge solids assayed 5.8% $SO_4$, and lime consumption was reduced to 12.5 kg CaO/t-solid to achieve a final pH of about 10.5 for the washed discharge solids. Gold and silver recoveries were 95.8 and 9.0%, respectively. Gold extraction was unchanged but silver recovery was significantly lower. These results show that dilution of the feed is effective in reducing basic iron sulphate formation and thereby reducing lime consumption. But, as noted above, this will result in higher capital costs. Silver recovery was also adversely affected.

Example 3

Example 3 also illustrates a conventional precious metal pressure oxidation process followed by cyanidation. In the process, the feed slurry was contacted with an acid consumer during pressure oxidation in an attempt to control basic iron sulphate and jarosite formation.

The same ore as presented above was processed through the same pilot autoclave, using the same conditions as in Example 1, but at a higher pulp density of 35% solids. In one test, no limestone was added to the autoclave feed, and, in a second test, 40 kg limestone/t-solid was added. The added limestone corresponds to a $CO_3/S^{2-}$ molar ratio of 0.155. Results are summarized in Table 1 below:

TABLE 1

The effect of limestone addition to the autoclave feed on subsequent lime consumption and gold recovery during cyanidation and CIL.

| Test | % Au Extraction | kg CaO/t-solid Consumed |
|---|---|---|
| Without limestone addition | 98.4 | 88.3 |
| With 40 kg/t limestone = $CO_3/S^{2-}$ molar ratio of 0.155 | 97.7 | 20.5 |

This result showed that the addition of an acid consumer to the autoclave feed is effective in reducing the lime consumption during neutralization of CIL feed and cyanide leaching from 88.3 kg CaO/t to 20.5 kg CaO/t for similar gold extraction. However, as noted above, this may result in higher operating costs due to the formation of substantial amounts of $CO_2$ gas in the autoclave, excessive loss of heat, and higher oxygen requirements from excessive venting.

Example 4

Example 4 illustrates a precious metal pressure oxidation process followed by cyanidation according to an embodiment of the present invention. In the process, the feed slurry was pressure oxidized under controlled conditions to control basic ferric sulphate and jarosite formation.

The same ore was processed through the same pilot autoclave, with all conditions being kept the same as those shown in Example 1, but the extent of oxidation was reduced in the first two compartments. The extent of the reaction was controlled by a combination of lower temperature in the first compartment of the autoclave (for example, 180-190° C. in the first compartment, 210° C. in the second compartment, and 230° C. in the rest of the autoclave) and reduced oxygen mass transfer (i.e. by reducing the agitator rotation and/or oxygen flowrate). As a result, the extents of sulphide oxidation were only 26% and 51% in the first and second compartments, respectively.

Overall gold and silver recoveries in the subsequent CIL cyanide leaching were 98.6% and 38.7% respectively. Lime requirements were reduced to 42 kg CaO/t, as compared with 77 kg/t with non-controlled oxidation.

Example 5

Example 5 illustrates a precious metal pressure oxidation process followed by cyanidation according to an embodiment of the present invention. In the process, the feed slurry was pressure oxidized under optimum or near optimum sulphide oxidation conditions and no attempt was made to control basic iron sulphate and jarosite formation during pressure oxidation. Rather, the discharge slurry was hot cured to dissolve the basic ferric sulphate precipitate prior to neutralization with lime.

The same ore was processed through the same pilot autoclave, with all conditions kept the same as those shown in Example 1 except for the pulp density that was increased to 45% solids. The high pulp density resulted in the production of a high sulphuric acid concentration in the autoclave, which resulted, in turn, in the formation of excessive basic iron sulphate in the autoclave. The discharge slurry from the autoclave was divided into two portions: one portion was processed conventionally by solid/liquid separation, neutralization of the washed solids with lime, and gold recovery by cyanidation/CIL. The other portion was "hot cured" by mixing/stirring the autoclave discharge slurry for 8 hours at 95° C. before subjecting it to the same steps of solid/liquid separation, neutralization of the washed solids with lime, and gold recovery by cyanidation/CIL.

Comparative results are presented in Table 2.

TABLE 2

Comparison of lime consumptions with and without hot curing

| Process Conditions | Autoclave Discharge solids | | Lime Consumption in cyanidation/CIL | Gold Extraction |
|---|---|---|---|---|
| | % S | g/t Au | kg CaO/t-solid | % |
| No Hot Curing | 3.40 | 4.29 | 81.1 | 97.8 |
| Hot Curing | 0.73 | 4.93 | 16.7 | 98.0 |

During hot curing, about 80% of the sulphate in the solid was dissolved due to the destruction of the basic iron sulphate. Consequently, lime consumption during neutralization of the washed solid and CIL was reduced from 81.1 kg/t CaO to 16.7 kg/t without affecting gold extraction, which remained at ~98%.

Example 6

Example 6 illustrates a precious metal pressure oxidation process according to an embodiment of the present invention. In the process, the feed slurry was pre-treated with a recycle acidic liquid stream from the hot curing step.

A sample of refractory gold ore from the same deposit was ground and contacted with a solution assaying 15.6 g/L Fe(total), 0.68 g/L $Fe^2+$, 38 g/L free $H_2SO_4$ acid and originating from the hot cured autoclave discharge. The contact was carried out for 2 hours at 90° C. and 36% solids.

The results are summarized in Table 3 below.

TABLE 3

Pre-oxidation of autoclave feed with ferric ions in the autoclave discharge

| Assays (g/L) | Hot Curing Liquor | Autoclave Feed Final |
|---|---|---|
| $Fe_T$ | 15.6 | 15.4 |
| $Fe^{2+}$ | 0.68 | 12.4 |
| Cu | 0.29 | 0.29 |
| Zn | 4.30 | 4.0 |
| free $H_2SO_4$ acid | 38 | 35 |

The results indicated that the pre-oxidation of the ore feed using hot curing liquor was successful since about 12 g/L ferric iron was consumed during pre-oxidation. After the liquid phase is separated, this will result in a significant reduction of oxygen usage inside the autoclave. Gold extraction after autoclaving during the test was as expected for that ore type, at 92% during a 24 hour CIL, and lime consumption was 3.7 kg CaO/t-solid. The autoclave discharge slurry was hot cured prior to solid/liquid separation and CIL cyanide leaching.

A number of variations and modifications of the invention can be used. It would be possible to provide for some features of the invention without providing others.

For example, in one alternative embodiment demonstrated in Example 5, each compartment of the autoclave is run under optimum or near optimum conditions for oxidizing sulphides followed by the hot cure step to convert at least most of the basic ferric sulphates and jarosites to the dissolved ferric sulphates. In this embodiment, the reaction conditions in the first few autoclave compartments are not controlled to minimize the production of basic ferric sulphates and jarosites. Rather, the reaction conditions are optimized for sulphuric acid production without regard to the amount of basic ferric sulphates and jarosites produced.

The present invention, in various embodiments, includes components, methods, processes, systems and/or apparatus substantially as depicted and described herein, including various embodiments, subcombinations, and subsets thereof. Those skilled in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A precious metal recovery process, comprising:
   (a) oxidizing an aqueous feed slurry in an autoclave, the feed slurry comprising a precious metal-containing material and sulphide sulphur, wherein at least most of the sulphide sulphur is oxidized to sulphate sulphur and wherein at least a portion of the sulphate sulphur is in the form of a reactive iron-containing precipitate;
   (b) removing, from the autoclave, an aqueous discharge slurry comprising discharge solids and aqueous discharge liquid, the discharge solids comprising at least a portion of the precious metal and at least most of the reactive iron-containing precipitate, and wherein the aqueous discharge slurry comprises an acid;
   (c) prior to contact of an acid consumer other than the reactive iron-containing precipitate with at least most of the discharge solids, allowing at least most of the reactive iron-containing precipitate in the discharge solids to react with the acid in the aqueous discharge liquid to form a hot cured slurry, the hot cured slurry comprising the discharge solids and a dissolved iron-containing species derived from the reaction of the acid and reactive iron-containing species;
   (d) after step (c), contacting the discharge solids with the acid consumer;
   (e) leaching at least most of the precious metal from the discharge solids to form a dissolved precious metal; and
   (f) recovering the dissolved precious metal.

2. The process of claim 1, wherein the reactive iron-containing precipitate comprises basic ferric sulphate, the dissolved iron-containing species comprises dissolved ferric sulphate, and the acid comprises sulphuric acid, wherein the precious metal is gold, wherein in step (c), the temperature of the aqueous discharge slurry is maintained at or above 60° Celsius, and wherein, in step (c), the aqueous discharge slurry is held in a stirred vessel and wherein, in the step (c)
   at least about 50% of the basic ferric sulphates in the aqueous discharge slurry is converted into dissolved ferric sulphate according to the following equation:

$$2Fe(SO_4)(OH)_{(s)} + H_2SO_4 = Fe_2(SO_4)_{3(aq)} + 2H_2O.$$

3. The process of claim 2, wherein the hot cured slurry comprises a liquid phase comprising dissolved ferric sulfate and a solid phase comprising the discharge solids and wherein the hot cured slurry comprises one or more of:
   i) from about 10 to about 140 g/l dissolved ferric sulphate in the liquid phase of the hot cured slurry;
   ii) no more than about 3 wt % basic ferric sulfate in the solid phase of the hot cured slurry;
   iii) no more than about 1 wt % jarosites in the solid phase of the hot cured slurry; and
   iv) from about 10 to about 40 g/l sulphuric acid in the liquid phase of the hot cured slurry, wherein, in step (d), the pH of any liquid in contact with the discharge solids is increased from a first pH in the range of from about pH 2.0 to about pH 5.0 to a second pH in the range of from about pH 9.0 to about pH 11.0.

4. The process of claim 2, wherein, after step (c), the hot cured slurry comprises:
i) from about 10 to about 140 g/l dissolved ferric sulphate, and
ii) from about 10 to about 40 g/l sulphuric acid, wherein the discharge solids, after step (c) comprise:
iii) no more than about 5 wt % basic ferric sulphates, and
iv) no more than about 5 wt % jarosites, wherein a liquid phase of the hot cured slurry after step (c) comprises at least about 70% of the ferric iron in the aqueous discharge slurry before step (c), further comprising:
after step (c) and before step (d), separating at least a portion of the liquid phase from a solid phase comprising the discharge solids, wherein the separated liquid phase comprises no more than about 1 wt % solids, and wherein the separated solid phase comprises no more than about 70 vol. % liquid.

5. The process of claim 2, wherein the hot cured slurry temperature is from about 70° to about 120° C.

6. The process of claim 2, wherein the hot cured slurry has a total iron content, wherein at least about 80% of the total iron content is from the dissolved ferric sulphate and wherein no more than about 20% of the total iron content is from the basic ferric sulphate.

7. The process of claim 3, further comprising:
(g) separating a solid phase of the hot cured slurry from the liquid phase, wherein the solid phase comprises at least most of the precious metal, and the liquid phase comprises at least most of the dissolved ferric sulphate and sulphuric acid.

8. The process of claim 7, wherein prior to step (g), but after step (c), the hot cured slurry temperature ranges from about 30° to about 50° C.

9. The process of claim 7, wherein the liquid phase comprises at least about 90% of the dissolved ferric sulphate and sulphuric acid and wherein any liquid reporting to the solid phase comprises no more than about 10% of the dissolved ferric sulphate.

10. The process of claim 7, further comprising after step (g):
(h) contacting the separated liquid phase with the acid consumer.

11. A precious metal recovery process, comprising:
(a) oxidizing sulphide sulphur in an aqueous feed slurry in an autoclave, the feed slurry comprising a precious metal-containing material, wherein at least most of the sulphide sulphur is oxidized to sulphate sulphur and wherein at least a portion of the sulphate sulphur is in the form of basic iron sulphate in a solid phase;
(b) removing, from the autoclave, an aqueous discharge slurry comprising discharge solids and aqueous discharge liquid, the discharge solids comprising at least a portion of the precious metal and at least most of the solid-phase basic iron-sulphate, and wherein the aqueous discharge slurry comprises sulphuric acid;
(c) allowing at least most of the solid-phase basic iron sulphate in the aqueous discharge solids to react with the sulphuric acid in the aqueous discharge liquid to form a hot cured slurry comprising ferric sulphate dissolved in the aqueous discharge liquid, wherein the allowing step (c) is performed in one or more hot cure vessels and wherein a residence time of the at least most of the solid-phase basic iron sulfate in the one or more hot cure vessels ranges from about 1 hour to about 24 hours;
(d) thereafter separating the aqueous discharge liquid from the aqueous discharge solids, wherein at least most of the dissolved ferric sulphate is in the separated aqueous discharge liquid and wherein the separated aqueous discharge solids comprise sulphuric acid;
(e) contacting an acid consumer with at least one of the separated aqueous discharge liquid and the separated discharge solids to form at least one of neutralized aqueous discharge liquid and neutralized aqueous discharge solids, respectively;
(f) contacting a lixiviant, at a pH above about pH 7.0, with the neutralized discharge solids to dissolve at least most of the precious metal; and
(g) recovering the dissolved precious metal.

12. The process of claim 11, wherein the precious metal is gold, wherein in step (c), the aqueous discharge slurry has a discharge slurry temperature, wherein the discharge slurry temperature is maintained at or above 60 degrees Celsius, and wherein, in step (c), the aqueous discharge slurry is held in a stirred vessel.

13. The process of claim 11, wherein the acid consumer is selected from the group consisting essentially of lime, limestone, and combinations thereof and wherein, in step (e), any liquid in the discharge solids has a discharge solids pH and wherein the discharge solids pH is increased from a first pH in the range of from about pH 2.0 to about pH 5.0 to a second pH in the range of from about pH 9.0 to about pH 11.0, and further comprising:
(h) contacting dissolved ferric sulphate in the separated aqueous discharge liquid with the acid consumer to convert at least most of the dissolved ferric sulphate to ferric hydroxide.

14. A precious metal recovery process, comprising:
(a) oxidizing an aqueous feed slurry in an autoclave, the feed slurry comprising a precious metal-containing material and sulphide sulphur, wherein at least most of the sulphide sulphur is oxidized to sulphate sulphur and wherein at least a portion of the sulphate sulpur is in the form of a reactive iron-containing precipitate;
(b) removing, from the autoclave, an aqueous discharge slurry comprising discharge solids and aqueous discharge liquid, the discharge solids comprising at least a portion of the precious metal and at least most of the reactive iron-containing precipitate, wherein the reactive iron-containing precipitate comprises basic iron sulphate, and wherein the aqueous discharge slurry comprises an acid;
(c) allowing at least most of the reactive iron-containing precipitate in the aqueous discharge solids to react with the acid to form a dissolved iron-containing species, wherein the dissolved iron-containing species comprises dissolved ferric sulphate, and wherein the acid comprises sulphuric acid;
(d) after step (c), contacting the discharge solids with an acid consumer, wherein the acid consumer is predominantly lime, wherein liquid in contact with the discharge solids has a discharge solids pH, wherein the discharge solids pH is increased from a first pH in the range of from about pH 2.0 to about pH 5.0 to a second pH in the range of from about pH 9.0 to about pH 11.0;
(e) contacting the dissolved ferric sulphate in the aqueous discharge liquid with lime and/or limestone to convert at least most of the dissolved ferric sulphate to ferric hydroxide;
(f) leaching at least most of the precious metal from the discharge solids to form a dissolved precious metal; and
(g) recovering the dissolved precious metal.

15. The process of claim 1, wherein the allowing step is performed in one or more hot cure vessels and wherein a residence time of the at least most of the reactive iron-containing precipitate in the one or more hot cure vessels ranges from about 1 hour to about 24 hours.

16. The process of claim 11, wherein step (c) is conducted prior to contact of at least most of the solid-phase basic iron sulphate with an acid consumer other than basic ferric sulphate.

17. The process of claim 10, wherein the acid consumer is selected from the group consisting of limestone, lime, and combinations thereof.

18. The process of claim 10, wherein the liquid phase pH is increased from a first pH ranging from about pH 0.5 to about pH 1.3 to a second pH ranging from about pH 4.5 to about pH 10.0.

19. The process of claim 10, wherein the acid consumer comprises first and second acid consumers and wherein step (h) comprises the sub-steps:
 (h1) performing a first neutralization step, wherein the first acid consumer is contacted with the dissolved ferric sulphate and sulphuric acid to form a first neutralization slurry; and
 (h2) performing a second neutralization step, wherein the second acid consumer differs from the first acid consumer and wherein the second acid consumer is contacted with the first neutralization slurry to form a second neutralization slurry.

20. The process of claim 19, wherein the first acid consumer is limestone and wherein the first neutralization slurry comprises ferric hydroxide and gypsum.

21. The process of claim 20, wherein the second acid consumer is lime, wherein the acid consumer is added during step h2 to form a second neutralization slurry, and wherein the acid consumer is added in a sufficient amount to achieve a second neutralization slurry pH of about pH 7.0 or greater.

22. The process of claim 10, wherein the added acid consumer causes the separated a liquid phase to have a pH of pH 7.0 or greater, and further comprising:
 (i) thereafter subjecting the separated liquid phase to a liquid/solid separation step to form a tailings solid residue and a recycle liquid.

23. The process of claim 22, wherein the recycle liquid is contacted with the hot cured slurry prior to step (h).

24. The process of claim 7, wherein the separated liquid phase is contacted with the precious-metal containing material prior to step (a).

25. The process of claim 7, wherein the separated solid phase comprises no more than about 10 wt% basic ferric sulphates and/or jarosites.

26. The process of claim 7, wherein the separated solid phase is contacted with the acid consumer, wherein the pH of the any liquid reporting to the separated solid phase is increased by the acid consumer from a first pH ranging from about pH 2 to about pH 5 to a second pH ranging from about pH 9 to about pH 11.

27. The process of claim 26, wherein the acid consumer is lime.

28. The process of claim 11, wherein the solid-phase basic iron sulphate comprises basic ferric sulphate and wherein the precious metal is gold.

29. The process of claim 11, wherein step (c) is conducted at a temperature of at least 60° C. and within a stirred hot cure vessel.

30. The process of claim 29, wherein step (c) is conducted at a temperature ranging from about 70° to about 120° C.

31. The process of claim 11, wherein the solid-phase basic iron sulphate comprises $Fe(OH)(SO_4)_{(s)}$ and the dissolved ferric sulphate comprises $Fe_2(SO_4)_{3(aq)}$ in a dissolved state, and wherein step (c) further comprises converting at least about 50% of the solid-phase $Fe(OH)(SO_4)_{(S)}$ to the $Fe_2(SO_4)_{3(aq)}$ in the dissolved state.

32. The process of claim 11, wherein the hot cured slurry comprises:
 the dissolved ferric sulphate at a concentration ranging from about 10 g/l to about 140 g/l; and
 the sulphuric acid at a concentration ranging from about 10 g/l to about 40 g/l; and wherein at least one of the following true:
  i) the hot cured slurry comprises no more than about 3 wt % of the solid-phase basic iron sulphate; and
  ii) the hot cured slurry comprises no more than about 1 wt % of jarosites in the solid phase.

33. The process of claim 11, wherein the hot cured slurry has a total iron content, wherein at least about 80% of the total iron content is from the dissolved ferric sulphate and no more than about 20% of the total iron content is from the solid-phase basic iron sulphate.

34. The process of claim 11, wherein after step (c) but prior to and/or during step (d), the hot cured slurry temperature is reduced to a temperature ranging from about 30° to about 50° C.

35. The process of claim 11, wherein the aqueous discharge liquid comprises at least about 90% of the dissolved metal sulphates and sulphuric acid and wherein the discharged solid comprises no more than about 10% of the dissolved metal sulphates.

36. The process of claim 11, wherein the aqueous discharge liquid is contacted with the acid consumer.

37. The process of claim 36, wherein the acid consumer comprises at least one of limestone, lime, and a mixture thereof.

38. The process of claim 11, wherein step (e) comprises the substeps:
 (e1) providing a first neutralization step, wherein a first acid consumer is contacted with the dissolved ferric sulphate and sulphuric acid to form the neutralized separated aqueous liquid; and
 (e2) providing a second neutralization step, wherein a second acid consumer, the second acid consumer being different than the first acid consumer, is contacted with the separated aqueous discharge solids to form the neutralized discharge solids.

39. The process of 38, wherein the first acid consumer is limestone and wherein the neutralized separated aqueous liquid comprises ferric hydroxide and gypsum solids.

40. The process of claim 39, wherein the second acid consumer is lime and wherein the second acid consumer is added in an effective amount during step e2 to achieve a neutralized discharge solids pH of about pH 7 or greater.

41. The process of claim 36, wherein through contact with the acid consumer the aqueous discharge liquid pH is increased from a first pH ranging from about pH 0.5 to about pH 1.3 to a second pH ranging from about 4.5 to about pH 10.0.

42. The process of claim 36, wherein the aqueous discharge liquid pH is about pH 7 or greater and wherein the aqueous discharge liquid pH 7 or greater is achieved by adding a sufficient amount of the acid consumer, and further comprising:
 subjecting the aqueous discharge liquid to a liquid/solid separation step to form a tailings solid residue and a recycle liquid.

43. The process of claim 42, wherein the recycle liquid is contacted with the hot cured slurry prior to step (d).

44. The process of claim 11, wherein a portion of the aqueous discharge liquid is contacted with the precious-metal containing material prior to step (a).

45. The process of claim 11, wherein the discharge solids comprises no more than about 10 wt % solid phase jarosites and/or the basic metal sulphates.

46. The process of claim 11, wherein the discharge solids are contacted with the acid consumer, wherein the discharge solids have a discharge solids pH and wherein the discharge solids pH is increased from a first pH ranging from about pH 2 to about pH 5 to a second pH ranging from about pH 9 to about pH 11.

47. The process of claim 46, wherein the acid consumer is lime.

48. A precious metal recovery process, comprising:
(a) oxidizing sulphide sulphur in an aqueous feed slurry in an autoclave, the feed slurry comprising a precious metal-containing material, wherein at least most of sulphide sulphur is oxidized to sulphate sulphur and wherein at least a portion of the sulphate is in the form of basic iron sulphate in a solid phase;
(b) removing, from the autoclave, an aqueous discharge slurry comprising discharge solids and aqueous discharge liquid, the discharge solids comprising at least a portion of the precious metal and at least most of the solid-phase basic iron sulphate, and wherein the aqueous discharge slurry comprises sulphuric acid;
(c) allowing at least most of the solid-phase basic iron sulphate in the aqueous discharge solids to react with the sulphuric acid to form ferric sulphate dissolved in the aqueous discharge liquid;
(d) thereafter separating the aqueous discharge liquid from the discharge solids, wherein at least most of the dissolved ferric sulphate is in the separated aqueous discharge liquid and wherein the separated aqueous discharge solids comprise sulphuric acid;
(e) contacting the separated discharge solids with an acid consumer to consume at least most of the sulphuric acid and dissolved metal sulphates to form a neutralized discharge solids, wherein the acid consumer is predominantly lime and/or limestone, wherein the separated discharge solids have a discharge solids pH, wherein the discharge solids pH is increased from a first pH in the range of from about pH 2.0 to about pH 5.0 to a second pH in the range of from about pH 9.0 to about pH 11.0;
(f) contacting the dissolved ferric sulphate in the aqueous discharge liquid with lime and/or limestone to convert at least most of the dissolved ferric sulphate to ferric hydroxide;
(g) contacting a lixiviant, at a pH above about pH 7.0, with the neutralized discharge solids to dissolve at least most of the precious metal; and
(h) recovering the dissolved precious metal.

49. The process of claim 48, wherein the acid consumer is other than the basic iron sulphate, wherein the allowing step (c) is conducted prior to contacting the acid consumer with at least most of the discharge solids of step (e), wherein the at least most of the basic iron sulphate in the discharge solids reacts with the sulphuric acid in the aqueous discharge liquid to form the dissolved ferric sulphate, wherein the aqueous discharge liquid forms a hot cured slurry comprising the discharge solids and the dissolved ferric sulphate and wherein the dissolved ferric sulphate is derived from the reaction of the sulphuric acid with the basic iron sulphate.

50. The process of claim 49, wherein, after step (c), the hot cured slurry comprises:
i) from about 10 to about 140 g/l dissolved ferric sulphate, and
ii) from about 10 to about 40 g/l sulphuric acid, wherein the discharge solids, after step (c), comprise:
iii) no more than about 5 wt % basic iron sulphates, and
iv) no more than about 5 wt % jarosites, wherein a liquid phase of the hot cured slurry after step (c) comprises at least about 70% of the ferric iron in the aqueous discharge slurry before step (c), and further comprising:
after step (c) and before step (d), separating at least a portion of the liquid phase from a solid phase comprising the discharge solids, wherein the separated liquid phase comprises no more than about 1 wt % solids, and wherein the separated solid phase comprises no more than about 70 vol. % liquid.

51. The process of claim 49, further comprising:
(i) after step (c), separating a solid phase of the hot cured slurry from a liquid phase, wherein prior to the separating step (i) the hot cured slurry temperature ranges from about 30 ° to about 50° C., wherein the solid phase comprises at least most of the precious metal, and the liquid phase comprises at least most of the dissolved ferric sulphate and sulphuric acid, wherein the liquid phase comprises at least about 90% of the dissolved ferric sulphate and sulphuric acid and wherein any liquid reporting to the solid phase comprises no more than about 10% of the dissolved ferric sulphate.

52. The process of claim 49, wherein the acid consumer comprises first and second acid consumers and wherein step (e) comprises the sub-steps:
(e1) performing a first neutralization step, wherein the first acid consumer is limestone, wherein the limestone is contacted with the dissolved ferric sulphate and sulphuric acid to form a first neutralization slurry comprising ferric hydroxide and gypsum; and
(e2) performing a second neutralization step, wherein the second acid consumer is lime, wherein the lime is contacted with the first neutralization slurry to form a second neutralization slurry, wherein the second acid consumer is lime, wherein the lime is added is added in a sufficient amount to achieve a second neutralization slurry pH of about pH 7.0 or greater, and further comprising:
(i) thereafter subjecting the second neutralization slurry to a liquid/solid separation step to form a tailings solid residue and a recycle liquid, wherein the recycle liquid is contacted with the hot cured slurry prior to step (d).

53. The process of claim 14, wherein the acid consumer is other than the reactive iron-containing precipitate, wherein the allowing step (c) is conducted prior to contacting the acid consumer with at least most of the discharge solids of step (d), wherein the at least most of the reactive iron-containing precipitate in the discharge solids reacts with the acid in the aqueous discharge liquid to form the dissolved iron-containing species, wherein the aqueous discharge liquid forms a hot cured slurry comprising the discharge solids and the dissolved iron-containing species and wherein the dissolved iron-containing species is derived from the reaction of the acid with the reactive iron-containing species.

54. The process of claim 53, wherein, after step (c), the hot cured slurry comprises:
i) from about 10 to about 140 g/l dissolved ferric sulphate, and
ii) from about 10 to about 40 g/l sulphuric acid, wherein the discharge solids, after step (c), comprise:

iii) no more than about 5 wt % basic ferric sulphates, and
iv) no more than about 5 wt % jarosites, wherein a liquid phase of the hot cured slurry after step (c) comprises at least about 70% of the ferric iron in the aqueous discharge slurry before step (c), and further comprising:
after step (c) and before step (d), separating at least a portion of the liquid phase from a solid phase comprising the discharge solids, wherein the separated liquid phase comprises no more than about 1 wt % solids, and wherein the separated solid phase comprises no more than about 70 vol. % liquid.

55. The process of claim 53, further comprising:
(h) after step (c), separating a solid phase of the hot cured slurry from a liquid phase, wherein prior to the separating step (h) the hot cured slurry temperature ranges from about 30° to about 50° C., wherein the solid phase comprises at least most of the precious metal, and the liquid phase comprises at least most of the dissolved ferric sulphate and sulphuric acid, wherein the liquid phase comprises at least about 90% of the dissolved ferric sulphate and sulphuric acid and wherein any liquid reporting to the solid phase comprises no more than about 10% of the dissolved ferric sulphate.

56. The process of claim 53, wherein the acid consumer comprises first and second acid consumers and wherein step (e) comprises the sub-steps:
(e1) performing a first neutralization step, wherein the first acid consumer is limestone, wherein the limestone is contacted with the dissolved ferric sulphate and sulphuric acid to form a first neutralization slurry comprising ferric hydroxide and gypsum; and
(e2) performing a second neutralization step, wherein the second acid consumer is lime, wherein the lime is contacted with the first neutralization slurry to form a second neutralization slurry, wherein the second acid consumer is lime, wherein the lime is added is added in a sufficient amount to achieve a second neutralization slurry pH of about pH 7.0 or greater, and further comprising:
(i) thereafter subjecting the second neutralization slurry to a liquid/solid separation step to form a tailings solid residue and a recycle liquid, wherein the recycle liquid is contacted with the hot cured slurry prior to step (d).

57. The process of claim 1, wherein the aqueous discharge slurry has a dissolved iron concentration of more than 1 gram/liter.

58. The process of claim 11, wherein the aqueous discharge slurry has a dissolved iron concentration of more than 1 gram/liter.

59. The process of claim 14, wherein the aqueous discharge slurry has a dissolved iron concentration of more than 1 gram/liter.

60. The process of claim 48, wherein the aqueous discharge slurry has a dissolved iron concentration of more than 1 gram/liter.

* * * * *

UNITED STATES PATENT AND TRADEMARK OFFICE
CERTIFICATE OF CORRECTION

PATENT NO. : 7,604,783 B2
APPLICATION NO. : 11/249120
DATED : October 20, 2009
INVENTOR(S) : King et al.

It is certified that error appears in the above-identified patent and that said Letters Patent is hereby corrected as shown below:

On the Title Page, Item (54) and at Column 1, lines 1-3 please correct the title as follows:

REDUCTION OF LIME CONSUMPTION WHEN TREATING REFRACTORY GOLD ORES OR CONCENTRATES

Signed and Sealed this

First Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,604,783 B2
APPLICATION NO. : 11/249120
DATED : October 20, 2009
INVENTOR(S) : King et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 793 days.

Signed and Sealed this

Fourteenth Day of December, 2010

David J. Kappos
*Director of the United States Patent and Trademark Office*